May 6, 1958 L. NAMENYI-KATZ 2,833,538
MAGNETIC TAPE RECORDERS
Filed March 5, 1956 2 Sheets-Sheet 1

Inventor
L. Namenyi-Katz

Inventor
L. Namenyi-Katz

United States Patent Office 2,833,538
Patented May 6, 1958

2,833,538

MAGNETIC TAPE RECORDERS

Laszlo Namenyi-Katz, London, England, assignor to Epsylon Research and Development Company Limited, Twickenham, England Application March 5, 1956, Serial No. 569,552

Claims priority, application Great Britain March 9, 1955

5 Claims. (Cl. 271—2.3)

This invention relates to magnetic tape recorders.

In the operation of tape recorders particularly multi-track tape recorders for use as scientific instruments certain aspects of the recorders are required to be of a high degree of accuracy. Thus the speed of running through of the tape is required to be accurately constant in both forward and reverse directions of drive and to be uninfluenced by bodily acceleration of the recorder while at the same time the drive must be instantaneously reversible. Also the tape must be kept applied to the recorder head in a state of uniform tension.

It is an object of the present invention to provide a tape recorder satisfying these requirements.

The invention consists of a tape recorder in which two capstan heads are associated with inertia wheels and are adapted to be simultaneously driven in opposite directions from the same motor, the direction of drive of the tape being determined by operation of one or other of a pair of pinch rollers associated one with each of the capstan heads and each adapted when operated to engage the tape with the respective capstan head.

The drive to each of the inertia wheels from the motor can take a number of forms but in a preferred construction one of the inertia wheels is directly driven and the other is driven from the first.

A convenient way of transferring the drive is by a jockey roller with its axis at right angles to those of the inertia wheels which engages simultaneously, under spring pressure, bevelled annular faces on the two inertia wheels.

The jockey wheel is conveniently made self-locating.

In order to enable the speed of drive to be determined by the inertia wheel independently of minor, short-term variations in the speed of the electric motor, the motor is coupled to drive the inertia wheels over a one-way or over-running clutch and a flexible coupling.

Figure 1:
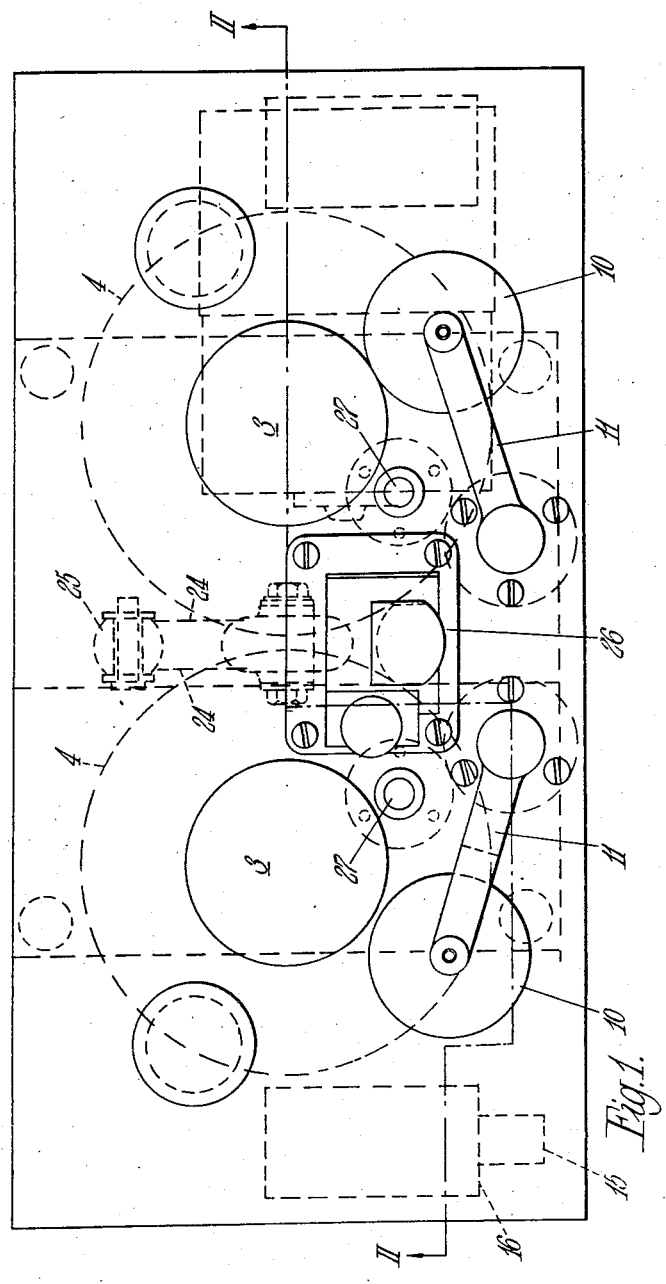
Figure 2:
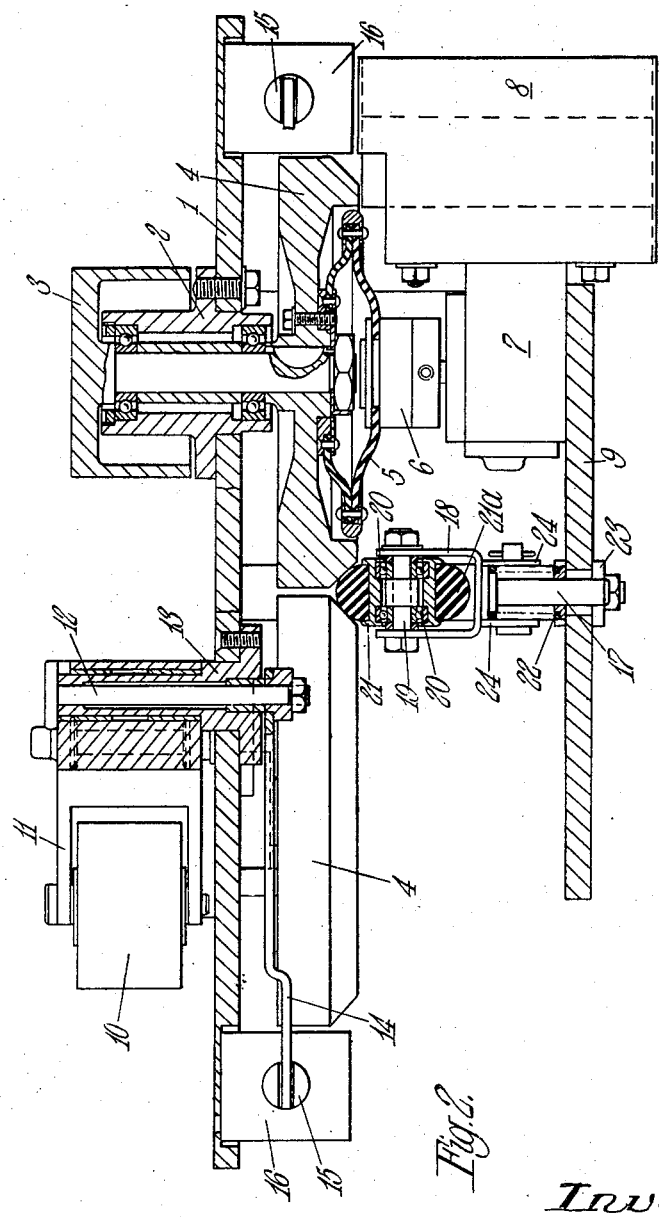

An embodiment of the invention will be described with reference to the accompanying drawings in which:

Figure 1 is a plan view, and
Figure 2 is a section on the line II—II of Figure 1.

On a base plate 1 there are secured at spaced positions two bearings 2 for capstan heads 3. Secured to the capstan head shafts below the base plate are bevelled inertia wheels 4.

Underneath one of the inertia wheels is secured a flexible coupling 5 and underneath the coupling 5 is secured a one-way or over-running clutch 6 of standard form which is adapted to be driven, over gearing 7 from an electric motor 8, the gearing 7 being mounted on a lower base plate 9.

Also mounted on the base plate 1 are two pinch wheels 10 comprising rubber rollers mounted on swinging arms 11 secured at their inner ends to vertical shafts 12 which pass through the base plate 1 and are mounted in bearing members 13 secured to the base plate 1.

The lower ends of the shafts 12 are rigidly secured to wire, radius arms 14 which are secured at their other ends to the cores 15 of solenoids 16.

Centrally mounted in the lower base plate 9 is a vertical shaft 17 carrying a stirrup 18 which supports a horizontal shaft 19 on which is mounted bearings 20 for a jockey pulley 21 with a rubber tire 21a of semi-circular section.

The stirrup 18 is forced upwardly by a spring 22 around the shaft 17.

The shaft 17 passes freely through a hole in the lower base plate 9 and is held by a washer 23 secured by a nut.

The shaft is thus free for limited movement in two horizontal directions but this movement is constrained as regards one of these directions by horizontal arms 24 secured one on each side underneath the stirrup 18 and extending to a pivotal member 25.

The tire 21a bears against the annular bevel surfaces of the inertia wheels 4 and is held by the arrangement described to be self-adjusting for wear and to ensure the transmission of drive from the right-hand inertia wheel in Figure 2 to the left-hand inertia wheel so that these rotate at all times in opposite directions at the same speed.

Also mounted on the base plate 1 is a recording head 26 which may be of the kind described in co-pending British patent application No. 6941/55.

In operation, with the motor 8 driving, the capstan heads 3 are rotated in opposite directions at the same speed. One or other of the pinch wheels 10 is turned by operation of the corresponding solenoid 16 to press the recording tape against the capstan head and initiate drive in one direction.

By releasing one solenoid 16 and operating the other there is an instantaneous changeover in direction of drive of the tape.

The pinch wheels will generally be of the same height as the width of the tape.

The tape is guided across the recording head by means of rollers 27 mounted on the base plate 1.

What is claimed is:

1. A tape recorder tape driving mechanism comprising a capstan head, an inertia wheel adapted to drive the capstan head, a pinch roller, means for engaging the pinch roller with the capstan head for driving a tape between the capstan head and pinch roller, a second capstan head, a second inertia wheel adapted to drive the second capstan head, a second pinch roller, second means for engaging the second pinch roller with the second capstan head to drive a tape between the second capstan head and second pinch roller, an electric motor and third means for driving the two inertia wheels from the electric motor simultaneously in opposite directions, whereby the tape may be driven in one direction by operation of the first engaging means, and in the other direction by release of the first engaging means and operating of the second engaging means and vice versa.

2. A tape recorder tape driving mechanism, as claimed in claim 1, in which the electric motor is coupled to drive the inertia wheels over a one-way clutch and flexible coupling.

3. A tape recorder tape driving mechanism comprising a capstan wheel, an inertia wheel connected to the capstan wheel to drive it, a pinch roller, means for engaging the pinch roller with the capstan wheel for driving a tape therebetween, an electric motor connected to the inertia wheel to drive it in one direction, a second capstan wheel, a second inertia wheel connected to the second capstan wheel to drive it, a second pinch roller, second means for engaging the second pinch roller with the second capstan wheel to drive a tape therebetween, and means for driving the second inertia wheel from the first inertia wheel, but in the opposite direction to the direction of drive of the first inertia wheel.

4. A tape recorder tape driving mechanism comprising a capstan wheel, a bevelled inertia wheel connected to the capstan wheel to drive it, a pinch roller, means for engaging the pinch roller with the capstan wheel for driving a tape therebetween, an electric motor connected to the bevelled inertia wheel to drive it in one direction, a second capstan wheel, a second bevelled inertia wheel connected to the second capstan wheel to drive it, a second pinch roller, second means for engaging the second pinch roller with the second capstan to drive a tape therebetween, and a jockey wheel mounted with its rotational axis at right angles to those of the inertia wheels, and engaging simultaneously under spring pressure the bevelled faces of the two inertia wheels, to drive the second inertia wheel from the first inertia wheel, but in the opposite direction to the direction of drive of the first inertia wheel.

5. A tape recorder, driving mechanism as claimed in claim 4, in which the jockey wheel is self-locating.

References Cited in the file of this patent

UNITED STATES PATENTS

| | | |
|---|---|---|
| 2,528,061 | Knapp | Oct. 31, 1950 |
| 2,637,561 | Connell | May 5, 1953 |